(12) United States Patent
Hille et al.

(10) Patent No.: US 9,836,034 B2
(45) Date of Patent: Dec. 5, 2017

(54) CONTROL UNIT FOR A PIECE OF FURNITURE

(71) Applicant: DEWERTOKIN GMBH, Kirchlengern (DE)

(72) Inventors: Armin Hille, Bielefeld (DE); Steffen Loley, Osnabrück (DE); Karsten Gehrke, Porta Westfalica (DE)

(73) Assignee: DewertOkin GmbH, Kirchlengern (DE)

( * ) Notice: Subject to any disclaimer, the term of this patent is extended or adjusted under 35 U.S.C. 154(b) by 615 days.

(21) Appl. No.: 14/381,847

(22) PCT Filed: Feb. 28, 2013

(86) PCT No.: PCT/EP2013/054101
§ 371 (c)(1),
(2) Date: Aug. 28, 2014

(87) PCT Pub. No.: WO2013/127961
PCT Pub. Date: Sep. 6, 2013

(65) Prior Publication Data
US 2015/0019020 A1    Jan. 15, 2015

(30) Foreign Application Priority Data
Feb. 28, 2012   (DE) .......................... 10 2012 101 627

(51) Int. Cl.
*G01M 1/38* (2006.01)
*G05B 15/02* (2006.01)
(Continued)

(52) U.S. Cl.
CPC ............ *G05B 15/02* (2013.01); *A47C 20/041* (2013.01); *A47C 31/008* (2013.01); *H04W 88/00* (2013.01)

(58) Field of Classification Search
None
See application file for complete search history.

(56) References Cited

U.S. PATENT DOCUMENTS

| 2008/0262657 A1 | 10/2008 | Howell et al. |
| 2009/0126115 A1 | 5/2009 | Doering et al. |
| 2011/0245979 A1 | 10/2011 | Koch |

FOREIGN PATENT DOCUMENTS

| DE | 102008033627 | 9/2009 |
| WO | WO 2013/057198 | 4/2013 |
| WO | WO 2013/072431 | 5/2013 |

OTHER PUBLICATIONS

International Search Report issued by the European Patent Office in International Application PCT/EP2013/054101 dated Jun. 11, 2013.

*Primary Examiner* — Adam Lee
(74) *Attorney, Agent, or Firm* — Henry M. Feiereisen LLC

(57) ABSTRACT

The invention relates to a control device (9) for at least one adjusting drive (7, 8) which is to be associated with a piece of furniture (1) and which is designed to control the at least one adjusting drive (7, 8) based on control data (20) captured by a wireless transmission path (19) of the operating unit (10). Said control device is characterized by an emitter interface (21) which is designed to transmit data (22) to the operating unit (10) by means of a wireless transmission path (19). The invention further relates to an operating unit (10) comprising a receiver interface (23) which is designed to capture data (22) from the control device (9) by means of a wireless transmission path (19), in addition to a system (18) consisting of a control device (9) and an operating unit (10) and a piece of furniture (1) equipped with said system (13).

17 Claims, 2 Drawing Sheets

(51) Int. Cl.
*A47C 20/04* (2006.01)
*A47C 31/00* (2006.01)
*H04W 88/00* (2009.01)

CONTROL UNIT FOR A PIECE OF FURNITURE

CROSS-REFERENCES TO RELATED APPLICATIONS

This application is the U.S. National Stage of International Application No. PCT/2013/054101, filed Feb. 28, 2013, which designated the United States and has been published as International Publication No. WO 2013/127961 and which claims the priority of German Patent Application, Serial No. 10 2012 101 627.5, filed Feb. 28, 2012, pursuant to 35 U.S.C. 119(a)-(d).

BACKGROUND OF THE INVENTION

The invention relates to a control unit for at least one adjustment drive to be arranged in a piece of furniture, wherein the control unit is configured to activate the at least one adjustment drive based on control data received via a wireless transmission link from an operating unit.

Adjustment drives, frequently also referred to as electromotive furniture drives, are installed in reclining furniture and seating furniture to be able to comfortably move an adjustment of the furniture parts such as seats, backrests, footrests, etc. in relation to a main body of the furniture and in relation to one another. Adjustable seating furniture, in particular so-called television chairs or relaxation chairs, typically have a relatively mechanically complex furniture fitting for this purpose, which, in cooperation of a plurality of levers and linkages, enables a complex movement sequence of the various cushion units installed thereon.

For the activation and power supply of the adjustment drives, a control unit is arranged on or in the piece of furniture, which receives operating commands of a user and converts them into activation signals for the adjustment drives. Particularly comfortable operation is possible using a wireless operating unit, which transmits control data via a wireless transmission link to the control unit.

Such a control unit and operating unit is known, for example, from document DE 10 2008 033 627 A1.

SUMMARY OF THE INVENTION

It is the object of the present invention to further improve the known control unit and the known operating unit, to achieve greater operating comfort and greater operating reliability.

The object is achieved by a control unit and an operating unit having the respective features of the independent claims. The object is furthermore achieved by a system made of such a control unit and such an operating unit, and also a piece of furniture equipped therewith. Preferred refinements are the subject matter of the dependent claims.

According to a first aspect of the invention, a control unit of the type mentioned at the outset comprises a transmission interface, which is configured to transmit data to the operating unit via the wireless transmission link.

The specified control unit is based on the consideration that the control unit mentioned at the outset is configured to exclusively receive data via a unidirectional wireless transmission link, for example, to change operating states of the piece of furniture. Based on this consideration, the specified control unit is based on the finding that it is sometimes not immediately clear to the user whether control data transmitted from the operating unit to the control unit, in particular if they do not relate to the adjustment drives, have also actually arrived at the control unit and can be executed as desired. This is in particular because of the unidirectional wireless transmission link, on which disturbances due to interference and other noise effects can corrupt control data emitted from the operating unit such that they can no longer be decoded or are even no longer receivable by the control unit. In particular in the case of actions which react comparatively slowly to emitted control data, for example, turning on a heater connected to the control unit, this is annoying for the user.

The specified control unit engages here and for example, transmits the operating state of the control unit or a component connected thereto back to the operating unit, so that the user can see and verify on the operating unit whether his control data, which are input on the operating unit and transmitted to the control unit, have also actually arrived, been correctly decoded, and have been executed on the control unit. The user therefore does not simply have a receipt confirmation transmitted, but rather directly sees the effect of his inputs on the operating unit.

Due to the transmission of the operating state of the piece of furniture from the control unit of the piece of furniture to the operating unit, the operating unit can furthermore be used as a storage device. For example, if a power failure occurs and all electrical components on the piece of furniture which are connected to the control unit are deenergized, the piece of furniture can automatically be brought back into the last operating state transmitted from the specified control unit based on the data present in the operating unit, after the restoration of the electrical power supply. For this purpose, the specified control unit is based on the consideration that a wirelessly operated operating unit must comprise an electrical power supply independent of the control unit in any case, for example, a battery, since it otherwise could not be wirelessly operated at all. The operating unit is therefore available as a data security source without further expenditure.

Putting the specified control unit back into operation or first putting it into operation can also be made easier with the specified control unit together with the operating unit, in that the specified control unit can transmit a request to the operating unit via the bidirectional wireless transmission link to couple the operating unit to the control unit, also referred to as "pairing", or to match the transmission frequency or the transmission protocol. This is simpler to handle for the user than if he has to carry out the pairing by means of switches on the control unit, because he does not know when the operating unit transmits data for the pairing via the wireless transmission link.

In one advantageous embodiment of the control unit, the data comprise an operating state of the control unit itself. In a further preferred embodiment, at least one further electrical component connected to the control unit is provided in the piece of furniture, wherein the data comprise a state of this component. The further electrical component which is connected to the control unit and controlled thereby can be, for example, a heating unit, e.g., a heated cushion or a heated blanket, a massage unit, or a lighting unit. In summary, the adjustment drives and the further electrical components are referred to as actuators hereafter. The data can thus relate, for example, to a current adjustment position of the piece of furniture or a specific supplied heating power of a heating unit or a set program of the massage unit.

In a further advantageous embodiment of the specified control unit, the state of the electric actuator comprises in this case an output power of the actuator, a program sequence to be carried out using the actuator, and/or an energy content of the electrical actuator.

In a further advantageous embodiment of the specified control unit, the transmission interface is configured to transmit service data to the operating unit via the actuator, which describe a load and/or usage of the actuator. In this manner, upcoming required maintenance measures for the piece of furniture can be displayed on the operating unit.

In particular, the service data can in this case comprise wear-related data, such as a number of the operating hours of the actuator, an activation duration of the actuator, an activation frequency of the actuator, or items of information about the load of the actuator.

In a further advantageous embodiment, the control unit has a detection unit for an adjustment position of the at least one adjustment drive, wherein the adjustment position is transmitted as a state of the adjustment drive to the operating unit. Such detections can be performed incrementally or absolutely. An incremental detection method comprises the counting of pulses of an incremental distance sensor, for example, the counting of pulses of a Hall sensor, which is arranged in the adjustment drive. Another incremental detection method comprises the counting of pulses of the counter electromotive force (EMF) of a brush-type DC motor of the adjustment drive. An absolute detection method analyzes an electrical signal of an absolute distance sensor, for example, in the form of a potentiometer, the slider of which follows the movement of an adjustment element of the adjustment drive.

According to a further aspect of the invention, an operating unit corresponding to the specified control unit is configured for the purpose, by transmitting control data to a control unit via a wireless transmission link, of activating at least one adjustment drive connected to this control unit. The operating unit comprises a reception interface, which is configured to receive data from the control unit via the wireless transmission link.

In an advantageous embodiment, the specified operating unit comprises an analysis unit for receiving and analyzing the data. In this manner, the state data arriving in the operating unit and transmitted from the control unit can be sorted and relayed to corresponding units in the operating unit.

In a further advantageous embodiment, the operating unit comprises a display unit for displaying the data.

In a further advantageous embodiment, it can be provided that the operating unit comprises a storage module, to store the data of a current or a predetermined adjustment position of the at least one adjustment drive. In this manner, a so-called memory function can be implemented. Current adjustment positions can therefore be manually taught or newly set repeatedly in the storage module and retrieved at a later point in time. The teaching is performed, for example, by pressing a programming button and by pressing a target selection button. Renewed pressing and holding of the target selection button starts a subprogram, wherein the adjustment position stored in the memory of the respective target selection button is compared as a target adjustment position to the actual adjustment position of the adjustment drive. In the event of a difference between the target position and the actual position, depending on the sign of the difference, the adjustment drive is activated in the corresponding adjustment direction until the difference between target position and actual position results as zero.

In a preferred embodiment, in addition to the storage module, a comparator or a program controller is also located in the operating unit for comparison between the target position and actual position. Alternatively, these components can also be arranged in the control unit. A movement command, to activate the adjustment drive into the corresponding adjustment position, is output by the operating unit as control data via the wireless transmission link. Alternatively, a program of the control unit triggers the movement command, to activate the adjustment drive into the corresponding adjustment position, which is controlled by another program of the operating unit.

In a further advantageous embodiment of the specified operating element, the analysis unit can be configured for the purpose of activating a further control unit of the piece of furniture or a further piece of furniture based on the data. In this manner, the specified control unit can adapt the movement of various actuators of the piece of furniture to one another as a synchronization unit, for example.

In this case, the analysis unit can be configured to activate the further control unit via a further wireless transmission link.

According to a further aspect of the invention, a system for controlling at least one adjustment drive of a piece of furniture comprises one of the specified control units, which is connected to the adjustment drive, and one of the specified operating units.

According to a further aspect of the invention, a piece of furniture having a frame element and a support element guided movably in the frame element via at least one adjustment drive comprises a specified system.

BRIEF DESCRIPTION OF THE DRAWING

The invention will be explained in greater detail hereafter on the basis of exemplary embodiments with the aid of the appended drawings. In the figures.

DETAILED DESCRIPTION OF PREFERRED EMBODIMENTS

Figure 1:
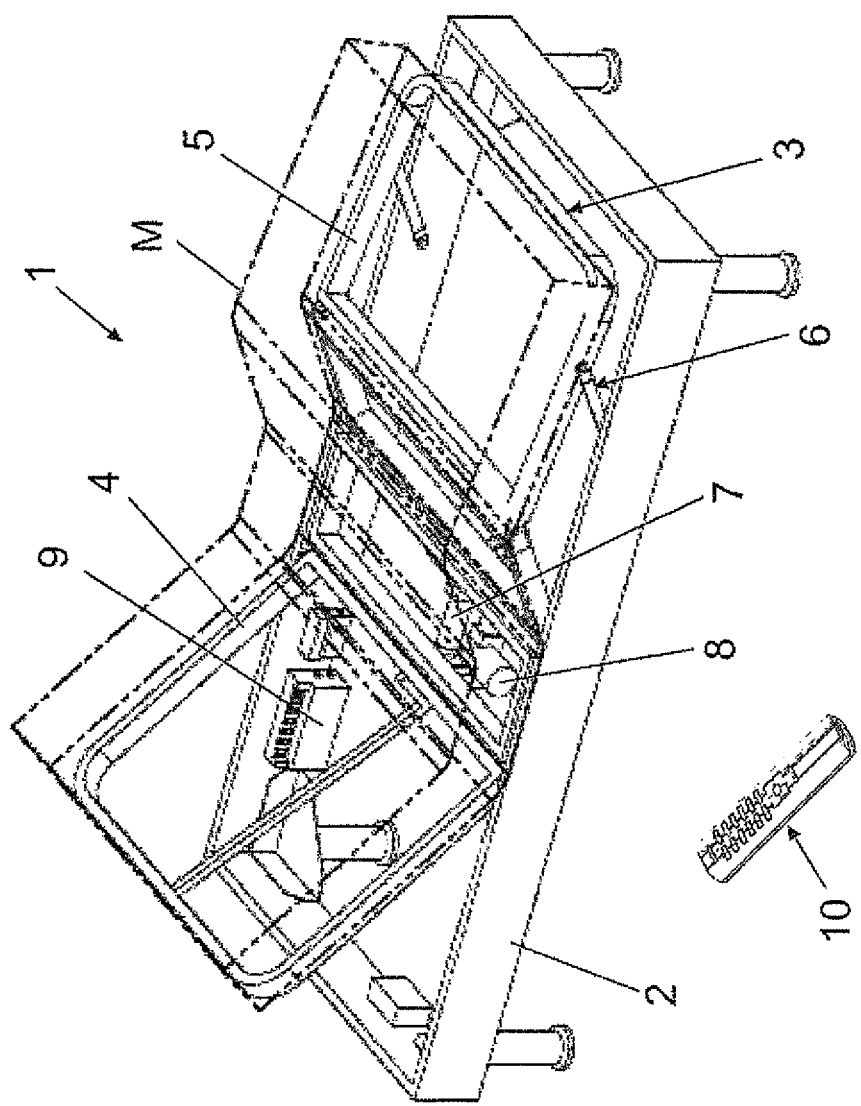
FIG. 1 shows a schematic perspective view of an exemplary furniture assembly.
Figure 2:
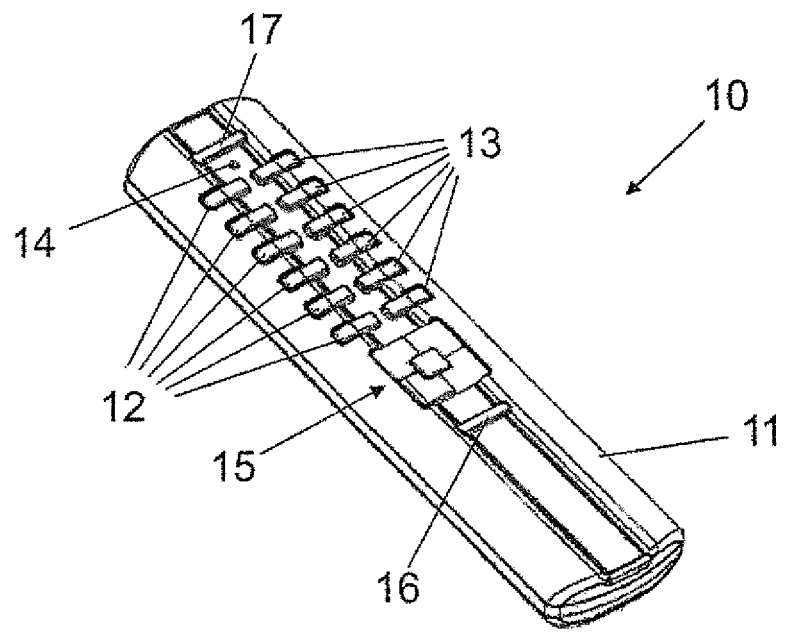
FIG. 2 shows a schematic perspective view of an operating unit.

FIG. 1 shows an exemplary furniture assembly having a piece of furniture 1. A schematic perspective view of an operating unit 10 is shown in FIG. 2.

The piece of furniture 1 is shown here as a bed and has at least one support element 3 for accommodating objects, a cushion, a mattress M, and/or a person. The support element 3 is implemented, for example, as a slatted frame, as a level support surface, or the like and is attached to a base element 2, here a framework having feet, for coupling the piece of furniture 1 to a setup location, for example, a floor.

The support element 3 has here a back part 4 and a leg part 5, which are arranged movably mounted in relation to a further support element or in relation to the base element 2. This movable arrangement is implemented here by means of a so-called movement fitting 6. The movement is implemented as displaceable and/or pivotable.

The movably mounted back part 4 and the leg part 5 are each coupled to an electromotive adjustment drive 7, 8. The back part 4 is thus coupled to the electromotive adjustment drive 7. The electromotive adjustment drive 8 is provided for the movement or adjustment of the leg part 5.

The electromotive adjustment drives 7, 8 are implemented here as linear drives. The linear drives have one or a number of electric motors, wherein a speed-reducing gear having at least one gear step is connected downstream from each motor. A further gear, for example, in the form of a threaded spindle gear, which generates a linear movement of the output element from the rotational movement of the motor, can be connected downstream from the speed-reducing gear. The last gear element or a further element connected thereto forms an output element. The output element of the respective adjustment drive is connected to the respective furniture component (back part 4, leg part 5) or alternatively to a component connected to the base frame 2, so that during an operation of the electric motor of the respective adjustment drive 7, 8, the movable furniture components 4, 5 are adjusted in relation to one another.

The adjustment drives 7, 8 are each connected to a control unit 9. This connection can be embodied as a pluggable cable connection, for example, which is not shown in greater detail here. The control unit 9 has an electrical power supply unit, which provides the electrical energy, for example, from the network, for the electromotive adjustment drives 7, 8. For this purpose, the control unit 9 is connectable in this example via a network cable (not shown) having a network plug to a network terminal. The network plug conducts, via the network cable, the input-side network voltage to the electrical supply unit of the control unit 9, which outputs a low voltage in the form of a DC voltage on the secondary side and relays it to a motor controller.

Alternatively thereto, a network-dependent voltage supply (not shown in greater detail) having network input and having secondary-side low voltage, which supplies the low voltage in the form of a DC voltage via a line, is connected upstream from the control unit 9.

Furthermore, an operating unit 10 is assigned to the piece of furniture 1, using the operating elements 12, 13 of which (see FIG. 2), the electromechanical adjustment drives 7, 8 are controllable via the control unit 9.

The operating unit 10 according to FIG. 2 is provided with a transmitting unit or transceiver unit for a wireless transmission The wireless transmission can be a radio transmission link, an optical transmission link (for example, infrared), and/or an ultrasound transmission link, wherein the control unit 9 is equipped with a respective corresponding receiving unit.

The operating unit 10 is provided with operating elements 12, 13, which are provided for operating a respective electromotive adjustment drive 7, 8. The operating elements 12, 13 are embodied as buttons, for example. For example, the operating elements 12 are used for raising and the operating elements 13 are used for lowering the respective movable furniture part. FIG. 2 shows operating units 10 for six adjustment drives.

Furthermore, the operating unit 10 is equipped with a display unit 14, for example, a light-emitting diode or a display screen. The display unit 14 is used, for example, for function display or feedback, error display, etc.

An auxiliary operating element 15, which can also consist of multiple operating elements and/or a combination operating element, is used for a so-called memory function of the adjustment drives 7, 8.

In addition, further electrical components connected to the control unit 9, for example, a reading lamp and/or a heater and/or a massage unit, can be operable by means of further auxiliary operating elements 16, 17. The auxiliary operating elements 15, 16, 17 can be embodied as buttons and/or switches.

Further display units can be associated with individual operating elements 12, 13, 15, 16, 17. Therefore, a display unit can be arranged adjacent to an operating element. Alternatively thereto, the respective operating element can be at least sectionally translucent, wherein the respective display unit is arranged in or directly below the respective operating element. Such display units are preferably formed by light-emitting diodes.

Upon actuation of an operating element 12, 13, a control signal for activating the respective electromechanical adjustment drive 7, 8 or another electrical component of the piece of furniture is transmitted wirelessly to the control unit 9 via the transmission link. The control unit 9 has switch elements, which convert the control signals of the transmission link into switching signals for switching the switch elements to move the respective adjustment drive 7, 8 or the respective electrical component. The switching elements can be, for example, relay switches and/or semiconductor switches. The manually operable operating elements 12, 13 of the operating unit 10 generate control signals, which are converted by the reception interface of the control unit 9 into control currents for the switching elements. In this case, the power switches of the relay switches or the semiconductor switches switch the high motor current of the respective adjustment drive 7, 8 or the operating current of the respective electric component of the piece of furniture. Massage units, heaters, beverage cooling units, lamps, etc. come into consideration as electric components of the piece of furniture. The state of the electrical component or components is displayed visually on the display unit via the wireless transmission link, for example, the massage intensity in the case of a massage unit or the heat intensity in the case of a heater.

Figure 3:
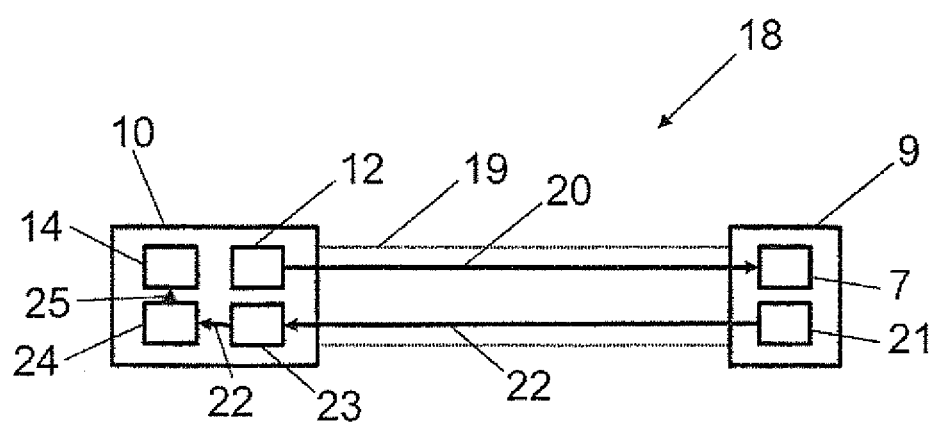
FIG. 3 shows a schematic view of a system made of a control unit and an operating unit.

FIG. 3 schematically shows a system 18 made of the control unit 9 and the operating unit 10, which communicate with one another in the present embodiment via a wirelessly established (radio) transmission link 19.

For the sake of clarity, only one is shown in each case in FIG. 3 of the operating elements 12, 13 for operating a respective electromotive adjustment drive 7, 8 and of the adjustment drives 7, 8 themselves. The operating element 12 of the operating unit 10 can transmit control data 20 to the adjustment drive 7, 8 via the wireless transmission link 19 and therefore change the adjustment position of the piece of furniture 1.

The adjustment position and states of the further electrical components connected to the control unit 9, for example, the mentioned reading lamp, heater, and/or massage unit, can then be collected and transmitted via a transmission interface 21 in the form of (state) data 22 to a reception interface 23 in the operating unit 10.

The received (state) data 22 are analyzed in the operating unit 10 in an analysis unit 24 and can be displayed as analyzed data 25 using the display element 14, for example. Alternatively or additionally, the analyzed data 25 can also be used to synchronize a further control unit on the piece of furniture 1 or a further piece of furniture, for example, a second part of a double bed, with the control unit 9.

Furthermore, service data can also be transmitted from the transmission interface 21, which describe a load and/or usage of the adjustment drive 7, 8, for example, and thus notify of upcoming maintenance, inter alia.

Furthermore, the control unit 9 can be equipped with an analysis program, which detects the overview of the adjustment drives 7, 8 and the further electrical components, which are currently connected to the control unit 9. Accordingly, the overview can be transmitted to the operating unit 10 and provided for visual display on a display screen by the operating unit 10, for example. For example, the type and number of the adjustment drives 7, 8 and the type and number of electrical components of the piece of furniture can be displayed and then operated depending on availability.

What is claimed is:

1. A control unit comprising:
   a transmission interface configured to transmit data to an operating unit via a wireless transmission link, wherein the transmission interface transmits to the operating unit first data including an adjustment position of at least one adjustment drive in a piece of furniture, and second data including a number of operating hours, an activation duration, and an activation frequency of the at least one adjustment drive, and wherein the operating unit analyzes the transmitted second data and displays maintenance measures for the piece of furniture in response to the analysis; and
   a detection unit for adjusting the position of the at least one adjustment drive, wherein said control unit activates the at least one adjustment drive based on control data received via the wireless transmission link from the operating unit.

2. The control unit of claim 1, wherein the first data further comprise a state of the control unit and/or of the at least one adjustment drive.

3. The control unit of claim 2, wherein the state comprises an output power, a program sequence to be carried out, or an energy content of the control unit, the at least one adjustment drive, or at least one further electrical component.

4. The control unit of claim 1, configured for connection to at least one further electrical component, which is also activated by the control unit in response to the received control data.

5. The control unit of claim 4, wherein the first data further comprise a state of the at least one further electrical component.

6. The control unit of claim 4, wherein the further electrical component is a heating unit, a massage unit, or a lighting unit.

7. An operating unit transmitting via a wireless transmission link control data to a control unit and activating at least one adjustment drive connected to the control unit, said operating unit comprising a reception interface configured to receive first and second data from the control unit via the wireless transmission link, wherein the received second data from the control unit comprises data including a number of operating hours, an activation duration, and an activation frequency of the at least one adjustment drive, and wherein the operating unit analyzes the received second data and displays maintenance measures for a piece of furniture in response to the analysis, and wherein the control unit comprises a detection unit for adjusting a position of the at least one adjustment drive, the adjustment position being transmitted as the first data to the operating unit.

8. The operating unit of claim 7, further comprising an analysis unit receiving and analyzing the second data.

9. The operating unit of claim 8, wherein the analysis unit is configured to activate a further control unit of the piece of furniture or a further piece of furniture in response to receiving and analyzing the second data.

10. The operating unit of claim 9, wherein the analysis unit is configured to activate the further control unit via a further wireless transmission link.

11. The operating unit of claim 7, further comprising a display unit displaying the maintenance measures.

12. The operating unit of claim 7, further comprising a storage module for an adjustment position of the at least one adjustment drive, or a comparator for comparing an actual adjustment position to a target adjustment position, or a program controller for determining the control data in dependence on a result of a comparison by the comparator.

13. A system for controlling at least one adjustment drive of a piece of furniture, comprising:
   a control unit connected to the at least one adjustment drive and activating the at least one adjustment drive based on control data received via a wireless transmission link from an operating unit, said control unit comprising a transmission interface configured to transmit to the operating unit first data including an adjustment position of at least one adjustment drive in a piece of furniture, and second data including a number of operating hours, an activation duration, and an activation frequency of the at least one adjustment drive;
   the operating unit transmitting via the wireless transmission link control data to the control unit, said operating unit comprising a reception interface configured to receive the first and second data from the control unit via the wireless transmission link, wherein the operating unit analyzes the received second data and displays maintenance measures for the piece of furniture in response to the analysis; and
   a detection unit for adjusting a position of the at least one adjustment drive.

14. A piece of furniture comprising:
   a frame element;
   a support element guided movably in the frame element via at least one adjustment drive; and
   the system as recited in claim 13.

15. The piece of furniture of claim 14, wherein the detection unit comprises an incremental distance sensor arranged in the adjustment drive, so that a detection of the adjustment position is performed by counting pulses.

16. The piece of furniture of claim 15, wherein the detection of the adjustment position is performed by counting the pulses of a counter electromotive force (IMF) of a brush type DC-motor of the adjustment drive.

17. The piece of furniture of claim 14, wherein an absolute detection method is used by analyzing an electrical signal of a potentiometer as an absolute distance sensor.

* * * * *